May 27, 1930.   J. EDGAR   1,760,125
HOB
Filed May 10, 1926   2 Sheets-Sheet 1

Inventor:
John Edgar
By Churchill Parker Watson
Att'ys.

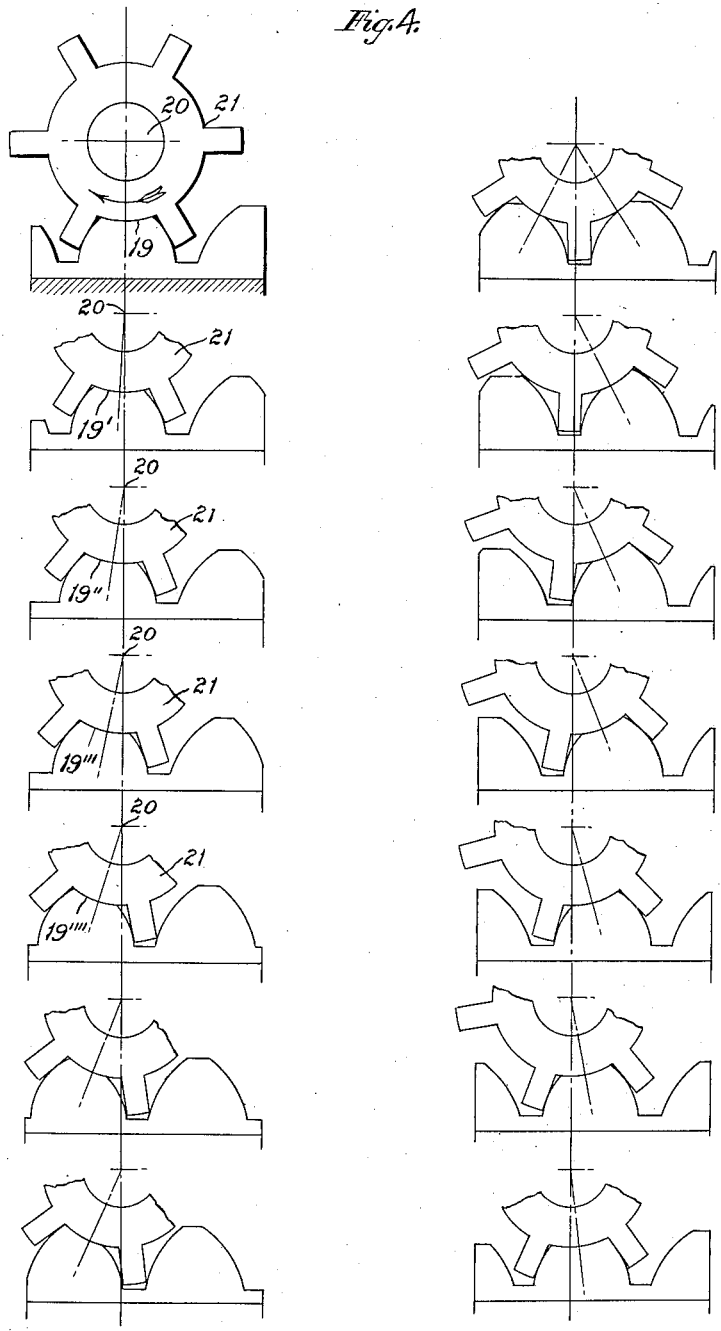

Patented May 27, 1930

1,760,125

UNITED STATES PATENT OFFICE

JOHN EDGAR, OF ROCKFORD, ILLINOIS, ASSIGNOR TO BARBER-COLMAN COMPANY, OF ROCKFORD, ILLINOIS, A CORPORATION OF ILLINOIS

HOB

Application filed May 10, 1926. Serial No. 107,848.

The invention relates to hobs for use in the generation of spline shafts, ratchets and other straight-toothed power transmitting devices.

Hobs employed in generating spline shafts, (the term spline shafts being used hereinafter to designate in general the class of toothed power transmitting devices having straight sides) differ from the hobs used in generating spur and similar types of gears. Hobs of the latter type are provided with straight flat sides having the angle of obliquity required on the gear, which, due to the rolling action of the hob in generating the gear, produce the required tooth form on the gear blanks. In order to produce straight sided teeth or keys, such for example as are required on spline shafts, the generated form must be provided on the hob, so that when the rolling motion between the hob and blank occurs, the above mentioned action will be reversed and straight sides will be produced on the spline shaft keys. This generated form, which must therefore be provided on the hob, consists of a curve of constantly changing radii, known in the art as involute curve.

Heretofore, spline shafts produced by a hobbing process have had certain inherent faults which were due partly to the hob construction. These faults were aggravated by the fundamental principle of the process and were especially noticeable when the key depth was great compared with the distance between keys.

It is therefore the general object of the invention to provide an improved hob of the type required for generating spline shafts, ratchets and other straight toothed power transmitting devices.

Another object of the invention is to provide an improved hob for generating spline shafts which have a tooth depth greater than the distance between the keys.

Another object of the invention is to provide an improved hob which will generate keys having parallel sides of greater depth than is now obtainable and still produce only a minimum radius at the root of the keys.

Another object is to provide an improved hob which will generate radial sides on toothed sections and with a minimum radius at the root.

A further object of the invention is to provide an improved hob which will give an undercut at the root of the tooth of greater magnitude than is now obtainable.

A still further object of the invention is to provide an improved hob which will form more nearly cylindrical sections between the keys than is obtainable with the use of the present type of hob.

Other objects and advantages will become apparent as the description proceeds.

In the drawings,

Fig. 4 is a diagrammatic view illustrating, step by step, the action of an improved hob in generating a spline shaft section.

Figure 1:
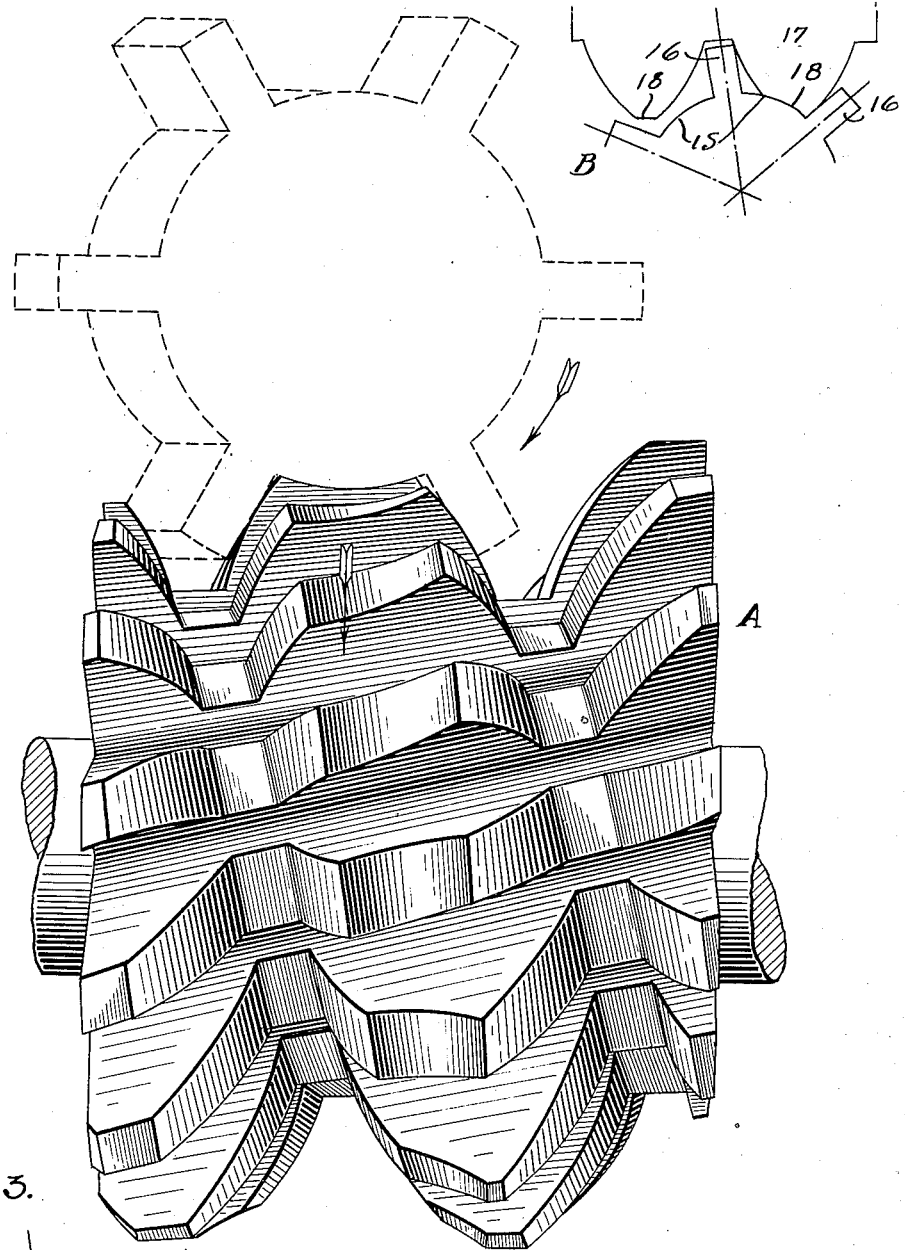
Figure 1 is a view of a hob embodying one form of the invention, shown in operative relation to a spline shaft.

While my invention is susceptible of embodiment in many different forms, I have shown in the drawings and will herein describe in detail two such embodiments with the understanding that the present disclosure is to be considered as an exemplification of the principles of the invention and is not intended to limit the invention to the embodiments illustrated. The scope of the invention will be pointed out in the appended claims.

When standard hobs are used to generate spline shafts, it is difficult to produce a key which has parallel sides throughout its depth, especially when the depth is relatively great compared to the distance between the keys. Hob structures have been provided which would produce a key having parallel sides for a greater depth than that obtainable by the use of standard hobs, but to accomplish this a special hob structure was necessary. These were generally of a form which would cut deeper into the blank at the roots of the keys in order that portions between the keys might be maintained or of a form having elongated or extensively protruding teeth which would cut away the entire cylindrical segment between the teeth.

It is the extreme outward end of the hob tooth which is utilized to form the roots of the keys. When, therefore, the parallel sides of the spline shaft keys are tangent to the curve of the hob tooth at the root of the key, then the tooth is in the act of forming this root. Therefore, in order to obtain a key having sides parallel to a predetermined depth, the point of tangency must be brought to that depth.

Since the side cutting edges of the hob teeth form the parallel sides of the key and the top of the teeth (in for example a hob having elongated teeth) act to cut away the segment between the keys, it is apparent that it would be advantageous to remove this interfering portion of the hob teeth and mill the desired root section. In my improved hob I remove those portions of the hob teeth or thread which extend into the center sections of the shaft between the keys, and I accomplish this by separate and additional operation on the hob.

Figure 2:
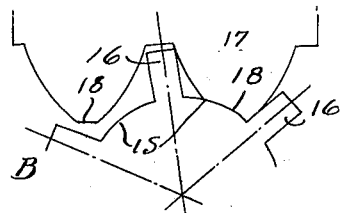
Fig. 2 illustrates one form of the improved hob generating a spline shaft.

I first produce a hob which is standard in all respects except that the tooth depth is greater than necessary to produce a root section of predetermined diameter in order to produce keys having parallel sides extending to the root, and then form a milling cutter superimposed thereon. That is, I thread, gash and relieve, or back-off a standard hob having elongated teeth. I then employ a form tool having a form complementary to the desired central section 15 between the keys 16 (Fig. 2), herein illustrated as cylindrical, to turn off the interfering portion of the thread to form a milling cutter to mill the said root section. This form tool has a contour modified to compensate for the helix angle of the hob and cuts a peripheral groove in the hob, the groove being circular in contour in a plane parallel to the cutting face of the teeth of the hob and, therefore, of elliptical contour in an axial plane. During this extra relieving operation, the form tool is fed radially toward the axis of the hob but has no lateral movement axially with respect to the hob 17 as is the case when relieving the threaded portion. The relieving operation may be carried on by well known means so that cutting edges 18 are produced on the hob.

This second operation cuts an annular groove forming circular depressions 19, 19′, etc., of varying depths on the top of the teeth of the hob, the centers 20 of the radii of these circular depressions being identical as illustrated in Figure 4. In use, the hob 17 must be set in relation to the work so that the centers 20 of these circular depressions are alined in the axis of the spline shaft 21 as indicated in Figure 4.

Figure 3:
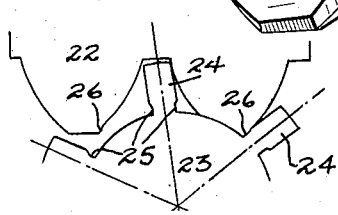
Fig. 3 shows a modified form of the improved hob and its relation to the spline shaft section produced thereby.

Figure 3 illustrates a modified form 22 of the invention adapted for use in generating a spline shaft 23 on which it is desired to finish the sides of the keys 24 by an abrasive operation. As it is difficult to secure a square corner with an abrasive wheel it is necessary that the spline shaft key be under cut at the root as indicated at 25 in order to avoid grinding an objectionable fillet at the tooth root. This is difficult to accomplish through the use of standard hobs because the point of tangency is so near the top of the spline shaft key i. e., at the top of the fillet formed at the root of the key, so that any projection on the hob tooth would destroy the parallel portions of the key. However, in the employment of my improved form of hob the point of tangency occurs at a lower point on the key and the removed sections include any projections which would be likely to destroy the parallel sides of the key. I, therefore, employ projecting portions 26 on my improved hob to secure the desired under cut.

Figure 1 illustrates a hob A of the preferred form of the invention, in its operative relation to a spline shaft B. The axis of the spline shaft is inclined to that of the hob to conform to the helix angle of the hob, and is positioned so that the centers of the circular depressions coincide therewith.

It will be apparent from the foregoing that my invention provides improved and desirable results in the manufacture of straight-toothed power transmitting devices and that with the invention in the form disclosed parallel sides may be obtained on keys substantially to the roots thereof. This is possible without cutting into the segmental portions of the spline shaft between the keys even when the tooth depth is greater than the distance between the keys.

I claim as my invention:

1. A hob of the character described comprising a threaded and gashed blank having relieved teeth, said blank having an annular groove forming depressions in said teeth.

2. A hob for generating straight-toothed power transmitting devices comprising a helically threaded blank having elongated teeth, said blank having a peripheral groove of elliptical contour in an axial plane intersecting said teeth.

3. A hob for generating straight-toothed power transmitting devices comprising a blank having a helical thread forming teeth with projecting portions adjacent the top thereof, and a peripheral groove intersecting said helical thread.

4. A hob for generating a spline shaft comprising a blank having teeth formed in a helix, said blank also having an annular groove intersecting said teeth forming circular depressions therein conforming in contour to the cylindrical sections of the spline shaft.

5. A hob comprising elongated cutting teeth to generate tooth sections to a predetermined depth, and having a superimposed milling cutter to form the root body portions between the teeth.

6. A hob comprising elongated teeth to generate tooth sections to a predetermined depth and having a peripheral groove generated from an axis which corresponds to the axis of the root section of said tooth sections.

7. A hob comprising teeth to generate tooth sections to a predetermined depth and having a peripheral groove generated in an axial plane from an axis which corresponds to the axis of the root section in a normal plane.

8. A hob for generating a spline shaft comprising a blank having teeth formed in a helix, said blank also having an annular groove intersecting said teeth forming depressions therein which are circular in contour in a plane parallel to the cutting faces of said teeth and of the same radius as that of the root section of the spline shaft.

9. A hob for generating a spline shaft comprising a blank having teeth formed in a helix, said blank also having an annular groove intersecting said teeth forming depressions of circular contour, the axis of said circular contour corresponding to the axis of the root portion between the teeth of the spline shaft.

10. A hob comprising elongated teeth formed in a helix to generate tooth sections to a predetermined depth and having a peripheral groove generated from an axis perpendicular to the normal plane of the helix at the point of cutting and by a radius equal to the radius of the root section of said tooth sections.

11. A hob for generating a spline shaft comprising elongated teeth to generate tooth sections to a predetermined depth and having a peripheral groove intersecting said teeth forming depressions therein which are circular in contour in a plane parallel to the cutting faces of said teeth.

In testimony whereof, I have hereunto affixed my signature.

JOHN EDGAR.